United States Patent
Tsukuda et al.

[11] Patent Number: 5,714,674
[45] Date of Patent: Feb. 3, 1998

[54] REFERENCE POSITION DETERMINATION METHOD FOR INDUSTRIAL ROBOT

[75] Inventors: Kouji Tsukuda; Toru Nakako, both of Fukuoka, Japan

[73] Assignee: Kabushiki Kaisha Yaskawa Denki, Fukuoka, Japan

[21] Appl. No.: 640,959

[22] PCT Filed: Sep. 19, 1995

[86] PCT No.: PCT/JP95/01863

§ 371 Date: May 10, 1996

§ 102(e) Date: May 10, 1996

[87] PCT Pub. No.: WO96/09146

PCT Pub. Date: Mar. 28, 1996

[30] Foreign Application Priority Data

Sep. 19, 1994 [JP] Japan .................. 6-251405

[51] Int. Cl.$^6$ .............. G01B 5/004; B25J 19/00; B25J 9/22
[52] U.S. Cl. .................. 73/1.79; 33/502
[58] Field of Search .............. 73/1 J, 1.79; 33/502

[56] References Cited

U.S. PATENT DOCUMENTS

| | | | |
|---|---|---|---|
| 5,125,261 | 6/1992 | Powley | 73/1 J |
| 5,187,874 | 2/1993 | Takahashi et al. | 73/1 J X |
| 5,214,857 | 6/1993 | McMurtry et al. | 73/1 J X |
| 5,269,067 | 12/1993 | Waeldele et al. | 73/1 J X |
| 5,313,410 | 5/1994 | Watts | 73/1 J X |
| 5,341,574 | 8/1994 | Bieg | 73/1 J X |
| 5,400,638 | 3/1995 | Kim | 73/1 J |
| 5,434,803 | 7/1995 | Yoshida | 73/1 J X |
| 5,492,003 | 2/1996 | D'Anna | 73/1 J |
| 5,501,096 | 3/1996 | Stettner et al. | 73/1 J |
| 5,533,271 | 7/1996 | Callaghan, Jr. | 73/1 J X |

FOREIGN PATENT DOCUMENTS 446716  7/1992  Japan .

*Primary Examiner*—Thomas P. Noland
*Attorney, Agent, or Firm*—Jordan and Hamburg

[57] ABSTRACT

In an industrial robot including a fixed base, a first arm rotatably attached to the fixed base, a second arm rotatably attached to the front end portion of the first arm, and a wrist portion provided with a wrist base and a movable flange attached to the front end portion of the second arm, determination of the reference position of the wrist portion is carried out individually or independently between the wrist portion and the second arm, and determinations of reference positions of the first and second arms, with respect to the fixed base are carried out by way of a positioning jig attached to the fixed base. Since an approach is employed to individually or independently carry out determination of a reference position or positions of one axis or plural axes including the front end axis of the wrist portion of the industrial robot, determination of reference positions can be carried out in the state where the tool is attached to the wrist front end portion.

8 Claims, 2 Drawing Sheets

Fig. 1
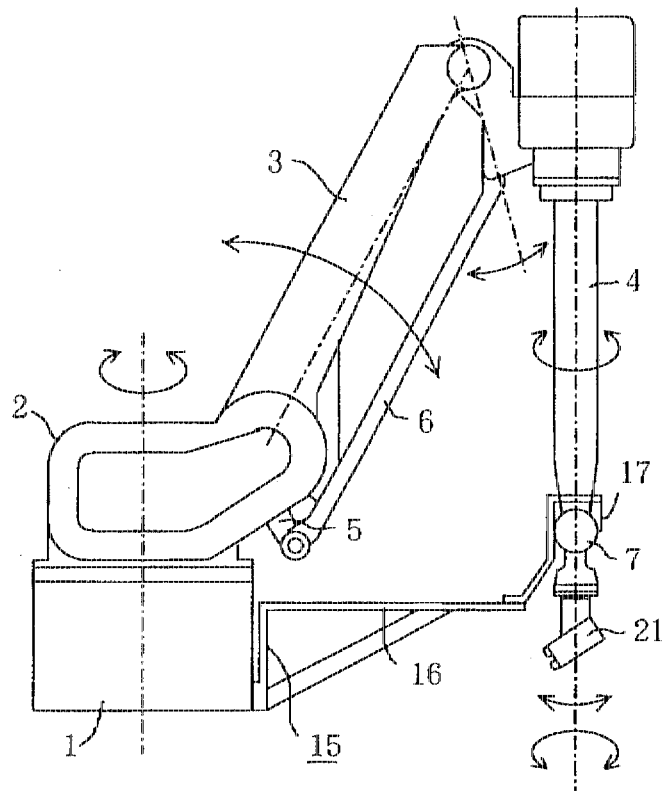
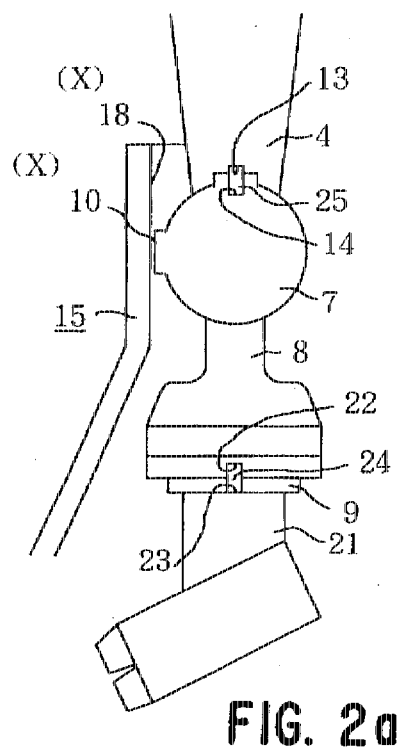
FIG. 2a
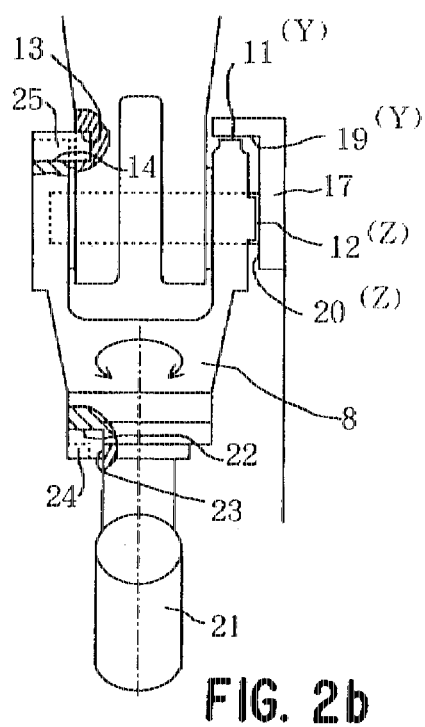
FIG. 2b

REFERENCE POSITION DETERMINATION
METHOD FOR INDUSTRIAL ROBOT

TECHNICAL FIELD

This invention relates to a reference position determination method for an industrial robot.

BACKGROUND ART

Hitherto, reference position determination in an industrial robot was carried out as shown in FIG. 4. Namely, a fixed side jig 35 provided with a plurality of dial gauges (indicators) 32, 33 and 34 is attached to a fixed base 81 of the industrial robot to allow a movable side jig 87 attached to a wrist front end portion 36 of the industrial robot to be in contact with the dial gauges 32, 33 and 34 of the jig 35 to thereby carry out determination of a reference position (e.g., Japanese Patent Publication No. 46716/1992).

However, in accordance with the prior art, since determination of a reference position is carried out in the state where the movable side jig 37 is attached to the wrist front end portion 36 of the industrial robot, there was the problem that the tool must be detached from the wrist front end portion 36.

In addition, since the tool must be removed (detached), there was the problem that it was required to carry out positioning between the wrist front end portion 36 of the industrial robot and the tool front end portion (working point) for a second time.

DISCLOSURE OF THE INVENTION

With the above in view, an object of this invention is to provide a method of carrying out determination of a reference position of an industrial robot while maintaining the state where the tool is attached to the wrist front end portion.

To solve the above-described problems, a reference position determination method for an industrial robot of this invention is such that, in an industrial robot comprising a fixed base, a first arm rotatably attached to the fixed base, a second arm rotatably attached to the front end portion of the first arm, and a wrist portion provided with a wrist base and a movable flange, attached to the front end portion of the second arm, determination of a reference position of the wrist portion with respect to the second arm is carried out individually or independently between the wrist portion and the second arm, and determinations of reference positions of the first and second arms with respect to the fixed base are carried out by a positioning jig attached to the fixed base.

Moreover, positioning grooves caused to be in correspondence with each other when the movable flange is located at a reference position with respect to the wrist base are respectively formed at the wrist base and the movable flange of the wrist portion; positioning grooves caused to be in correspondence with each other when the wrist base is located at reference position with respect to the second arm are respectively formed at the second arm and the wrist base; reference planes in X, Y and Z directions are formed on the surfaces in the X, Y and Z directions of the wrist base; a positioning jig is attached to the fixed base to form reference planes in the X, Y and Z directions corresponding to the reference planes in the X, Y and Z directions of the wrist base on the surfaces in the X, Y and Z directions of the positioning jig; positions of the respective positioning grooves of the wrist base and the movable flange are caused to be in correspondence with each other to carry out positioning of the movable base with respect to the wrist base; and the reference planes in the X, Y and Z directions of the wrist base are caused to be respectively tightly in contact with the reference planes in the X, Y and Z directions of the positioning jig to carry out determinations of reference positions of the first arm and the second arm with respect to the fixed base.

Since the above-described means are used in the industrial robot to carry out determination of reference position of the movable flangle with respect to the wrist base of the wrist portion individually or independently, to carry out determination of reference position of the wrist base with respect to the second arm individually or independently, and to carry out determinations of reference positions of only the first arm and the second arm with respect to the fixed base by means of the positioning jig, there is no necessity of detaching tool from the wrist front end portion at the time of positioning.

As described above, in accordance with this invention, since an approach is employed to individually or independently carry out determination of reference positions of one axis or plural axes including the front end axis of the wrist portion of the industrial robot, determination of reference position can be advantageously carried out in the state where tool is attached to the wrist front end portion.

BRIEF DESCRIPTION OF THE DRAWINGS

FIG. 1 is a side view showing an embodiment in the case where this invention is applied to a six-axis revolute joint type robot, wherein there is shown an attitude of the robot when the reference position of the industrial robot is determined, FIG. 2(a) is a side view showing details of the wrist portion in the embodiment of this invention, FIG. 2(b) is a front view showing details of the wrist portion.

BEST MODE FOR CARRYING OUT INVENTION

Figure 3:
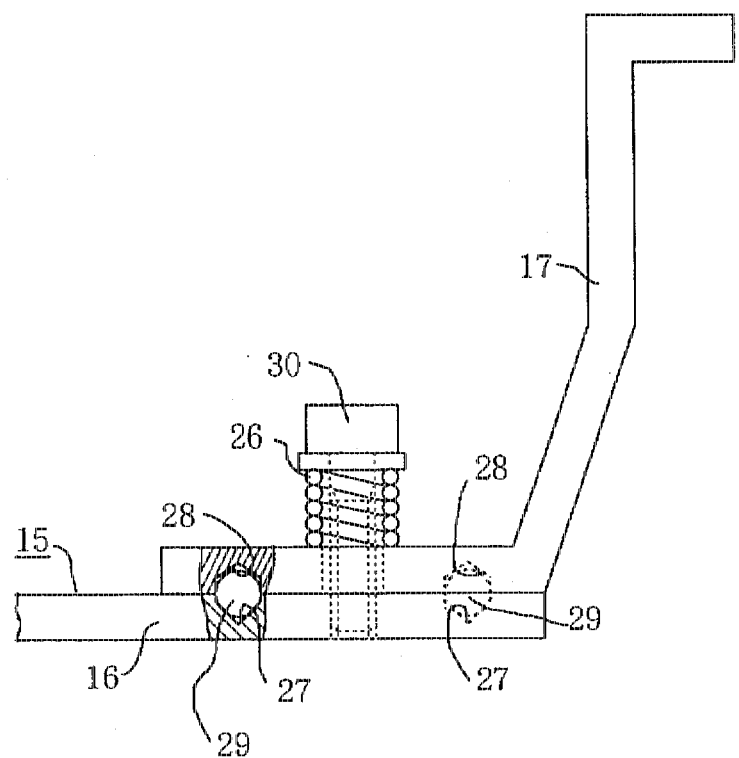
FIG. 3 is an enlarged side view of the front end portion of a positioning jig which shows a second embodiment of this invention.
Figure 4:
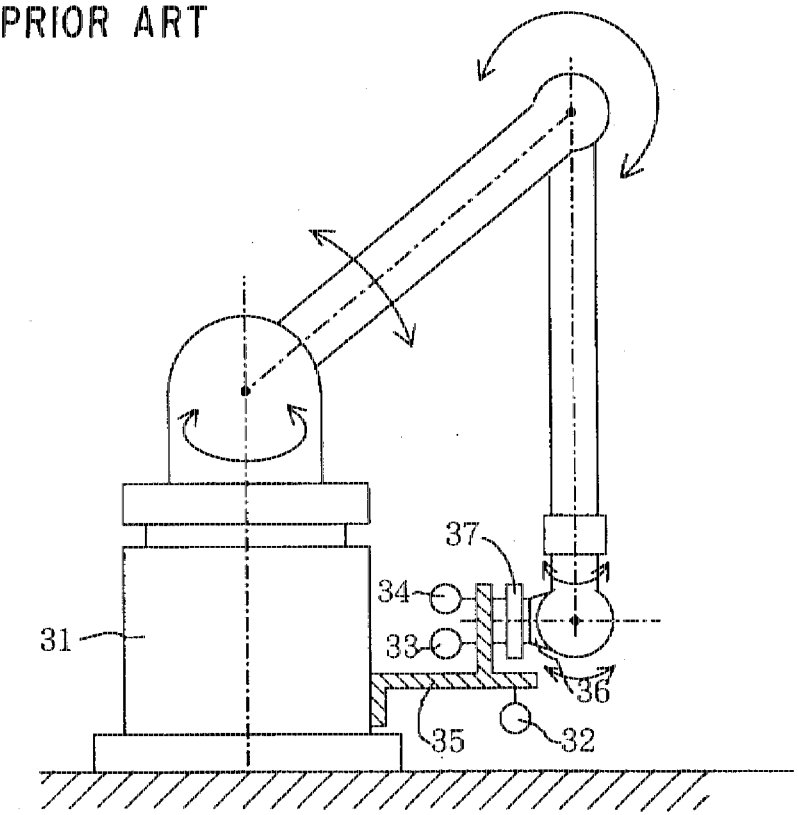
FIG. 4 is a side view showing a conventional reference position determination method.

A first embodiment of this invention will now be described with reference to the attached drawings.

FIG. 1 is a side view showing the embodiment in the case where this invention is applied to a six-axis revolute joint type robot, and shows the attitude of the robot when the reference position of the industrial robot is determined. FIGS. 2(a) and 2(b) show the detail of the wrist portion, wherein FIG. 2(a) is a side view and FIG. 2(b) is a front view.

In FIG. 1, reference numeral 1 denotes a fixed base, wherein a turning body portion 2 is rotatably provided within a horizontal plane surface at the upper portion. Reference numeral 3 denotes a first arm which is provided at the turning body portion 2 so that it can be moved in upper and lower directions. Reference numeral 4 denotes a second arm which is provided at the front end portion of the first arm 3 so that it can be moved in upper and lower directions. Reference numerals 5 and 6 denote links for driving the second arm. Reference numeral 7 denotes a wrist portion provided at the front end portion of the second arm 4 so that twisting, flexing (bending) and rotation can be made, and is provided with a wrist base 8 and a movable flange 9, wherein reference planes 10, 11 and 12 in X, Y and Z directions are formed on the surfaces in the X, Y and Z directions of the wrist base 8. Reference numeral 13 denotes a positioning groove e.g., key groove, etc. formed in the second arm 4. Reference numeral 14 denotes a positioning groove such as a key groove, etc. similar to the above, formed at the wrist base 8. These two positioning grooves 18, 14 are caused to be in correspondence with each other when the wrist base 8 is located at the reference position with respect to the second arm 4.

Reference numeral 15 denotes a positioning jig which is composed of a body portion 16 and a positioning portion 17, wherein the body portion 16 is detachably attached to the fixed base 1. Moreover, on the positioning portion 17, there are reference planes 18, 19 and 20 in the X, Y and Z directions corresponding to the reference planes 10, 11 and 12 in the X, Y and Z directions of the wrist base 8. Reference numeral 21 denotes a tool which is attached to the front end portion of the wrist portion 7. The attitude and position of the tool 21 are controlled by twisting, flexing (bending) and rotation operations of the wrist portion 7. Reference numeral 22 denotes a positioning groove, e.g., key, groove, etc. formed on the wrist base 8, and reference numeral 23 denotes a positioning groove such as key groove similar to the above, formed at the movable flange 9. These two positioning grooves 22, 23 are caused to be in correspondence with each other when the movable flange 9 is located at the reference position with respect to the wrist base 8.

The reference position determination method for an industrial robot constituted in this way will now be described.

Initially, determination of the reference position with respect to the wrist base 8 of the movable flange 9 to which the tool 21 is attached, i.e., determination of the reference position of the wrist front end axis for rotating the movable flange 9, is carried out by allowing the positioning groove 23 provided at the movable flange 9 to be in correspondence with the positioning groove 22 provided at the wrist base 8. Correspondence between these two positioning grooves is carried out by inserting a positioning piece 24, e.g., key, etc. so as to bridge over both positioning grooves.

Further, determination of a reference position with respect to the second arm 4 of the wrist base 8, i.e., determination of the reference position of the axis for carrying out flexing (bending) operation of the wrist portion 7, is carried out by allowing the positioning groove 14 provided at the wrist base 8 to be in correspondence with the positioning groove 13 provided at the second arm 4. Correspondence between these two positioning grooves 13, 14 is carried out by inserting a positioning piece 25, e.g., key, etc. so as to bridge over the both positioning grooves 13, 14.

After the determination of the reference position with respect to the second arm 4 of the wrist base 8 is completed, determinations of reference positions with respect to the fixed base 1 of the first arm 3 and the second arm 4, i.e., determinations of reference positions of respective axes for driving the both arms 3, 4, are carried out.

The determinations of reference positions of the first arm 3 and the second arm 4 with respect to the fixed base 1 are carried out by allowing reference planes 10, 11, 12 in the X, Y, Z directions of the wrist base 8 to be respectively firmly in contact with the reference planes 18, 19, 20 in the X, Y, Z directions of the positioning jig.

Since it is unnecessary to have the front end portion of the wrist portion 7 to be in contact with the positioning jig 15, there is no need to detach the tool 21 from the wrist portion 7 when for determining the reference position of the robot.

FIG. 8 is an enlarged side view of the front end portion of the second embodiment of the positioning jig 15, i.e., the positioning portion 17 which shows the second embodiment.

In the second embodiment, the positioning jig 15 is adapted so that a body portion 16 and the positioning portion 17 are constituted as separate members, and the positioning portion 17 is caused to undergo pressing and fixing onto the body portion 16 by an elastic body 26 such as a coil spring, etc., whereby even in the case where the wrist portion 7 or the wrist base 8 collide with the positioning portion 17 by erroneous operation of the robot, the impact can be absorbed.

In this case, at both surfaces opposite to each other of the body portion 16 and the positioning portion 17, recessed portions 27 and 28 are respectively formed at two corresponding positions or more, and a ball 29 is inserted into these recessed portions 27, 28. Accordingly, even if the wrist base 8 collides with the positioning portion 17 of the positioning jig 15 so that the position of the positioning portion 17 is shifted, when the wrist portion 7 is away from the positioning jig 15, it becomes possible to ensure precise reference position for a second time. Moreover, even in the case where position of the positioning portion 17 is greatly shifted, the recessed portions 27, 28 of the positioning portion 17 are returned to the position of the ball 29 to allow the ball 29 to fall within the recessed portion 27, thereby making it possible to easily return the positioning portion 17 to the reference position. In FIG. 3, reference numeral 30 denotes a bolt screwed into the body portion 16.

While there is disclosed in the above-described embodiments a description of this invention applied to a six-axis revolute joint type robot, this invention can be applied to robots of arbitrary number of axes without being limited to the six-axis revolute joint type robot.

It is to be noted that while the reference position determination method using the positioning groove and the positioning piece is used for determination of the reference position of the wrist portion with respect to the second arm, such reference position determination method may be also used for determination of the reference positions of the first and second arms with respect to the fixed base.

This invention can be utilized, when applied to an industrial robot, in the field for providing a reference position determination method for an industrial robot which permits determination of the reference position while the tool is attached at the wrist front end portion.

What is claimed is:

1. A reference position determination method for an industrial robot comprising a fixed base, a first arm rotatably attached to the fixed base, a second arm rotatably attached to the front end portion of the first arm, and a wrist portion provided with a wrist base and a movable flange, which is attached to the front end portion of the second arm, the method comprising the steps of:

determining a reference position of the wrist portion with respect to the second arm utilizing a set of positioning means formed on said wrist portion itself and on said second arm itself, determining reference positions of the first and second arms with respect to the fixed base utilizing a positioning jig attached to the fixed base, and effecting said step of determining the reference position of the wrist portion with respect to the second arm independently of effecting said step of determining the reference positions of the first and second arm with respect to the fixed base.

2. A reference position determination method for an industrial robot as set forth in claim 1, further comprising:

providing positioning grooves on said wrist base itself and on the movable flange itself and effecting alignment of the said positioning grooves when the movable flange is located at a reference position with respect to the wrist base, said step of utilizing a set of positioning means formed on said wrist portion itself and on said second arm itself including providing positioning grooves on said wrist portion and on second said arm and effecting alignment of the last said positioning grooves when the wrist portion is located at a reference position with respect to the second arm, providing reference surfaces in X, Y and Z directions on the wrist base, providing a positioning jig attached to the fixed base with reference surfaces in the X, Y and Z directions corresponding to the reference surfaces in the X, Y and Z directions of the wrist base, and effecting firm contact of the reference surfaces in the X, Y and Z directions on the wrist base with the reference surfaces in the X, Y and X directions on the positioning jig respectively to thereby carry out determinations of the reference positions of the first arm and the second arm with respect to the fixed base.

3. A reference position determining method as set forth in claim 2, comprising providing the positioning jig with a jig body and a positioning piece, and effecting pressing of the positioning piece on the jig body by an elastic body to absorb impact when the wrist base collides with the positioning piece.

4. A method for determining the reference positions of industrial robots of the type having a fixed based, a first arm rotatably attached to the fixed base, a second arm rotatably attached to the first arm, and a wrist means rotatably attached to the second arm comprising the steps of:

determining the reference position of the wrist means with respect to the second arm utilizing alignment devices on said wrist means and on said second arm which align with one another when said wrist means and said second arm are in said reference position;

determining the reference position of the first and second arms with respect to the fixed base;

utilizing a positioning jig attached to the said fixed base for determining the reference position of the first and second arms with respect to the fixed base; and carrying out said step of determining the reference position of the wrist means with respect to the second arm utilizing said alignment devices independently of determining the reference position of the first and second arms with respect to the fixed base utilizing said positioning jig.

5. A method according to claim 4 comprising:

providing said alignment devices in the form of a first groove in the wrist means and a second groove in the second arm;

aligning said first and second grooves to thereby determine that said wrist means is in said reference position with respect to the second arm;

providing mutually perpendicular surfaces on the wrist means disposed in the X, Y and Z directions;

providing mutually perpendicular surfaces on the positioning jig disposed in the X, Y and Z directions; and positioning said mutually perpendicular surfaces on the wrist means firmly into contact with the respective mutually perpendicular surfaces on said positioning jig such that the mutually perpendicular surfaces on said wrist means extending in the X, Y and Z directions are firmly in contact respectively with the mutually perpendicular surfaces on said positioning jig extending in the X, Y and Z direction to thereby determine the reference position of the first and second arm with respect to the fixed base.

6. A method according to claim 5 wherein said wrist means includes a wrist base and a movable flange and further comprising:

determining the reference position of the movable flange with respect to the wrist base by providing further alignment devices on said movable flange and on said wrist base which align with one another when said movable flange and said wrist base are in their reference position.

7. A method according to claim 6 further comprising:

providing said further alignment devices in the form of a third groove in the movable flange and a fourth groove in the wrist base; and aligning said third and fourth grooves to thereby determine that said movable flange is at said reference position with respect to the wrist base.

8. A method according to claim 4 further comprising providing the positioning jig with a jig body and a positioning piece, and effecting an elastic connection between said positioning jig and said jig body to absorb impact when the wrist base body collides with the positioning piece.

* * * * *